Oct. 24, 1967 B. ANTHUN 3,349,331

DISTORTIONLESS VOLUME-TONE CONTROL CIRCUIT

Filed May 13, 1964

INVENTOR
Bjarne Anthun

BY Mueller & Aichele

ATTYS

United States Patent Office 3,349,331
Patented Oct. 24, 1967

3,349,331
DISTORTIONLESS VOLUME-TONE CONTROL CIRCUIT

Bjarne Anthun, Bensenville, Ill., assignor to Motorola, Inc., Franklin Park, Ill., a corporation of Illinois
Filed May 13, 1964, Ser. No. 366,979
4 Claims. (Cl. 325—424)

ABSTRACT OF THE DISCLOSURE

This circuit includes a tone control circuit connected across the output of the diode detector stage of an AM radio. The tone control circuit comprises a capacitor in series with a variable resistor, which is connected to ground. A second resistor is coupled across the capacitor of the tone control circuit in series with the variable resistor. The direct current bias circuit for the detector includes a voltage divider which has a resistor connected to a positive DC bias potential in one leg, and the other leg comprises the resistor in series with the tone control variable resistor. Varying the tone control resistor therefore changes the DC bias to compensate for changes in loading on the diode detector.

This invention relates to radio receivers, and more particularly to a tone control circuit for an amplitude modulation radio receiver.

Amplitude modulation (AM) radios generally incorporate a diode to detect the audio frequency signal modulating the modulated radio frequency signal. A tone control is often incorporated in radio receivers of this type to provide variable attenuation of high frequency signals. At high levels of input signal to the radio receiver, distortion may occur with the tone control in the bass position. This distortion can sometimes be avoided by optimizing the circuit for operation with the tone control in the bass position, but this may result in distortion of all frequencies at low levels of input signal. Where a compromise design is utilized to optimize the circuit somewhere in between the extreme settings of the tone control, the range over which the tone control can be varied without distortion may be limited.

Accordingly, it is an object of this invention to provide a wide range, low distortion tone control for an AM radio receiver.

Another object of the invention is to provide a simple low cost tone control circuit for an AM radio receiver, which circuit provides low distortion throughout its range.

A feature of the invention is the provision of a tone control circuit for an AM radio receiver, which circuit comprises a capacitor and variable resistor in series connected across the output of the detector, and further comprises a resistor connected across the capacitor.

Another feature of the invention is the provision of a tone control circuit for an AM radio receiver, which circuit comprises a resistor with a variable tap connected to a reference potential and with one end of the resistor connected to an intermediate tap on a volume control pot and to a capacitor connected to a reference potential, and with the other end of the resistor connected by a parallel capacitor-resistor combination to the output of the detector.

Figures 1, 2, 3:
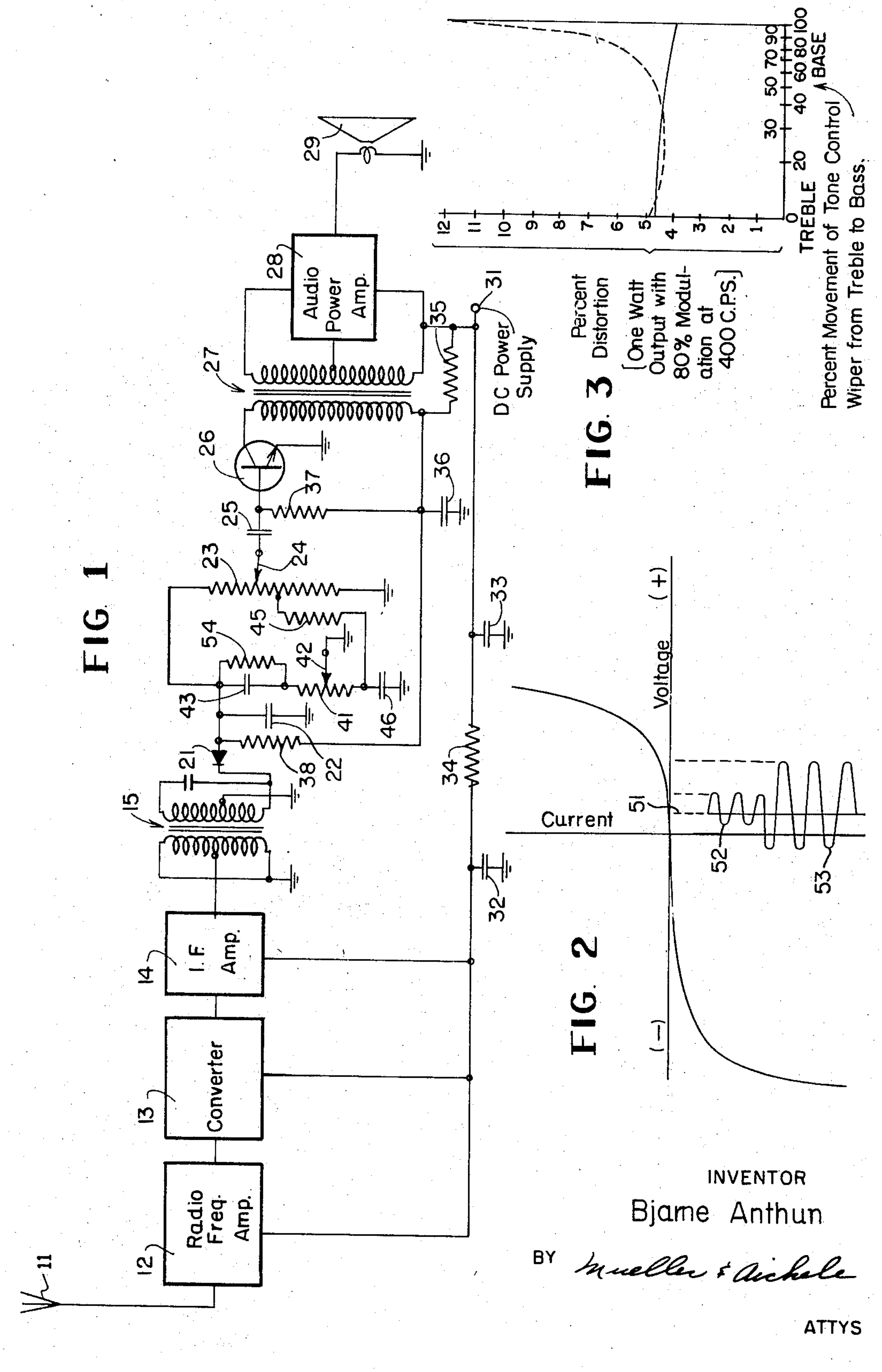
FIG. 1 is a schematic diagram of an AM radio receiver having a tone control circuit constructed in accordance with the invention.
FIG. 2 is a graph to illustrate the operation of the tone control with reference to the characteristics of the detector diode.
FIG. 3 is a graph to illustrate the improved distortion levels obtainable with the circuit of the invention.

In accordance with the invention, a tone control circuit is provided for a radio receiver and includes a variable resistor and a capacitor connected in series across the output of a diode detector of the radio receiver. The variable resistor causes the loading of the detector to vary according to its setting, and accordingly, a resistor is connected across the capacitor and comprises a part of a direct current bias circuit for the detector. The resistor and the variable resistor thereby compensate the detector bias for variation in detector load according to the setting of the variable resistor.

This invention may be incorporated in a circuit having a simple tone control, or in a tone control and volume control system which includes variable bass boost at low level volume settings. In this latter instance, the variable resistor has one end connected through the capacitor and resistor parallel combination to the output of the detector diode, and has the other end connected to an intermediate tap of the volume control potentiometer. This other end is also connected through a capacitor to a reference potential, and the tap on the variable resistor is connected to a reference potential.

Referring now more particularly to FIG. 1, an AM radio receiver incorporating the invention is shown schematically. Radio frequency signals received at antenna 11 are amplified in radio frequency amplifier 12 and converted to an intermediate frequency in converter 13. The signals are amplified in intermediate frequency amplifier 14 and are applied through a coupling transformer 15 to the detector.

The detector is comprised of semiconductor diode 21 and a storage capacitor 22. Diode 21 passes only those signals on the negative cycle of the intermediate frequency signals applied thereto, which are then stored in capacitor 22 and discharged partially during the positive cycles of the intermediate frequency signals applied to the diode. Accordingly, as is well known in the art, the output of the detector follows the envelope of the intermediate frequency signals applied thereto. This envelope is the audio signal used to modulate the transmitted carrier.

The output of the detector is applied to a volume control potentiometer comprised of resistor 23 and variable tap 24. Variable tap 24 is connected through a blocking capacitor 25 to the base of the first audio amplifier stage, transistor 26. Transistor 26 is an NPN transistor having a common emitter and is coupled through transformer 27 to a push-pull audio power amplifier 28. The output of amplifier 28 is then applied to speaker 29 for reproduction as audio intelligence.

The DC power supply 31 is connected through a filter comprised of capacitors 32 and 33 and resistor 34 to amplifiers 12 and 14 and converter 13. Power supply 31 is also connected through a resistor 35 and the primary of transformer 27 to the collector of transistor 26. A filter capacitor 36 grounds one side of resistor 35 and this side of resistor 35 is connected through a further resistor 37 to the base of transistor 26. The side of resistor 35 opposite power supply 31 is also connected through a further resistor 38 to the anode of diode 21 for biasing the diode at the desired operating point on its characteristic curve.

A tone control comprised of a resistor 41 having a variable tap 42 is incorporated in the system for providing the user of the receiver with a control for setting the relative levels of bass and treble signals to a desirable relation. Resistor 41 has one end connected through a capacitor 43 to the anode of diode 21. The combination of capacitor 43 and the left side of resistor 41 provides a variable impedance path for high frequency signals, which signals, when variable tap 42 is close to the left hand side of resistor 41, are attenuated to emphasize the bass frequencies.

A bass boost connection is provided in the tone control circuit in order to increase the bass response at low level settings of the volume control potentiometer. This is accomplished by connecting a resistor 45 from an intermediate point on resistor 23 to ground through a capacitor 46. As variable tap 24 is moved to low level settings on resistor 23, that is, below the fixed tap connected to resistor 45, the path through resistor 45 and capacitor 46 will attenuate high frequency signals to provide the desired bass boost. Bass boost is made variable according to the setting of the tone control by connecting the right hand end of resistor 41 to the juncture between capacitor 46 and resistor 45.

It will be seen that resistors 38, 41, 45 and 23 comprise a voltage divider for biasing the detector diode 21. Diode 21 is biased by a predetermined amount in order to maintain its operating point on the substantially flat portion of its characteristic curve. As illustrated in FIG. 2, this flat portion extends a short distance on either side of the origin with a greater part thereof being on the negative or left hand side. As may be seen from FIG. 2, with an operating point at 51 and with a low level of input signal illustrated by the curve 52, the negative excursions of the input signal will stay on the flat portion of the diode characteristic curve. With a stronger signal, however, illustrated by curve 53, the excursions may swing out beyond the flat portion of the diode characteristic curve and begin to distort. This difficulty is compounded when the tone control potentiometer is moved to the bass position. That is because in this position, the load on the detector is very high (the load impedance being low), increasing the voltage excursions.

Such a condition may be avoided in one of two ways. The value of resistor 38 could be selected so that the operating point 51 would be further to the left on the characteristic curve. Since the positive or left hand excursions of the incoming signal to the detector are discarded, the fact that such signals were distorted is insignificant. Nevertheless, for extremely high input signals, the operating point 51 will have to be moved far to the left. With very strong input signals, the percentage of the signal distorted would be low enough as to be negligible. However, for low input signals the distorted portion would be an extremely high percentage of the total signal.

This invention contemplates varying the bias on detector diode 21 in order to move the operating point 51 to the left when strong signals are received, and to keep point 51 toward the right when low level signals are received. This is done by providing a resistor 54 connected across capacitor 43. Resistor 54 is in series with resistor 38 and the left hand portion of resistor 41, thereby constituting a part of the bias network for diode 21. The value of resistor 38 is chosen to provide optimum performance in the treble settings of the tone control, that is, the furtherest to the right setting of variable tap 42. The value of resistor 54, on the other hand, is chosen to provide optimum performance in the bass setting of the tone control, that is, with variable tap 42 furthest to the left.

The beneficial result of such a circuit is illustrated in FIG. 3. The dotted curve 61 illustrates the distortion occurring where an input signal of 5,000 microvolts is applied to antenna 11 and where the tone control circuit does not include resistor 54. Curve 62, on the other hand, shows the results for the same input signal when resistor 54 is included in the circuit. As may be readily observed, for settings of the variable tap 42 close to the left hand portion of resistor 41, the absence of resistor 54 results in very high distortion, whereas its presence actually reduces distortion to below the levels at treble settings of the tone control.

A practical operating circuit incorporating the invention has been constructed with components of the following values:

| | | |
|---|---|---|
| Resistor **35** | ohms | 270 |
| Resistor **37** | megohms | 1 |
| Resistor **38** | kilohms | 120 |
| Resistor **41** | do | 100 |
| Resistor **45** | ohms | 680 |
| Resistor **23** | kilohms | [1] 10 |
| Resistor **54** | ohms | 3,300 |
| Capacitor **33** | microfarads | 500 |
| Capacitor **32** | do | 500 |
| Capacitor **36** | do | 100 |
| Capacitor **25** | do | 5 |
| Capacitor **22** | do | .01 |
| Capacitor **43** | do | .2 |
| Capacitor **46** | do | .47 |

[1] 5K above the fixed tap and 5K below.

The resistance of the portion of the secondary winding of transformer 15 below the tap was 5.5 ohms.

It may therefore be seen that the invention provides a wide range low distortion tone control for an AM radio receiver which has simple circuitry of low cost. The diode detector is biased for optimum performance at all positions of the tone control to reduce distortion at high levels of received signals and improve tone quality.

I claim:

1. A radio receiver having a diode detector, including in combination, a direct current voltage divider having first and second legs and an intermediate point connected to the detector for biasing the same, said first leg of said divider being connected across the output of the detector and including a parallel combination of a resistor and a capacitor in series with a variable resistor, said capacitor and said variable resistor forming a tone control circuit for the radio receiver, and said resistor and said variable resistor changing the detector bias for variation in detector load according to the operation of the tone control circuit.

2. In a radio receiver having a diode detector, a direct current bias circuit connected to the diode, and a tone control circuit including a variable resistor and a capacitor connected in series and across the diode detector to form a high frequency attenuating path, the combination including, a resistor connected across the capacitor and forming a part of the bias circuit with the variable resistor to change the detector bias for variation in detector load according to the setting of the tone control.

3. A radio receiver having a diode detector and a direct current bias circuit therefor, including in combination, first resistor means having a first end and a variable tap connected to a reference potential, capacitor means connecting said first end to the output of the diode detector to provide a path for attenuating high frequency signals according to the setting of said variable tap, second resistor means connected across said capacitor and between said first end of said first resistor means and the direct current bias circuit, said first and second resistor means forming part of the direct current bias circuit to compensate the bias on the diode detector for variation in detector load according to the setting of said variable tap.

4. In a radio receiver, a volume-tone control circuit for coupling a diode detector to an audio amplifier, including in combination, first resistor means connected across the output of the detector and having a first variable tap connected to the audio amplifier to provide volume control, second resistor means, first capacitor means connected in series with said second resistor means across a portion of said first resistor means to provide bass boost when said first variable tap is at said portion of said first resistor means, third resistor means having a first end and having a second end connected to the juncture of said second resistor means and said first capacitor means, said third resistor means further having a second variable tap connected to a reference potential to permit variation in the bass boost provided by said second resistor means and said first capacitor means, said second variable tap and said first and second resistor means providing direct current bias for the diode detector, second capacitor means connecting said first end of said third resistor to the output of the diode detector to form a variable tone control with said second variable tap for attenuating high frequency output signals from said detector, and fourth resistor means connected across said second capacitor means in series with said third resistor means providing direct current bias for the diode detector for changing the bias on said diode detector according to the setting of said second variable tap.

No references cited.

KATHLEEN H. CLAFFY, *Primary Examiner.*

R. LINN, *Assistant Examiner.*